Sept. 7, 1948.   G. R. READING ET AL   2,448,620
RECOVERY OF HYDROGEN FLUORIDE BY DISTILLATION
WITH AN OLEFIN
Filed July 17, 1944

INVENTORS
G. R. READING
R. E. VINYARD
BY Hudson and Young
ATTORNEYS

Patented Sept. 7, 1948

2,448,620

UNITED STATES PATENT OFFICE 2,448,620

RECOVERY OF HYDROGEN FLUORIDE BY DISTILLATION WITH AN OLEFIN

George R. Reading and Roy E. Vinyard, Phillips, Tex., assignors to Phillips Petroleum Company, a corporation of Delaware Application July 17, 1944, Serial No. 545,385

13 Claims. (Cl. 260—683.4)

1

This invention relates to the recovery of hydrogen fluoride and more particularly to the recovery of hydrogen fluoride from admixture with light hydrocarbons especially paraffinic hydrocarbons including butane and lighter paraffins. Still more particularly, it relates to the recovery of hydrogen fluoride, both that which is present as residual or unspent hydrogen fluoride catalyst and that which is derived from the decomposition of organic fluorides in the hydrocarbon effluent of a hydrogen fluoride alkylation process, especially a process wherein an isoparaffin is alkylated with a low-boiling aliphatic olefin in the presence of hydrogen fluoride. In its more specific aspect the invention is employed in conjunction with a process wherein isobutane is alkylated with a butylene in the presence of hydrogen fluoride.

The principal object of the present invention is to provide an improved method of recovering free hydrogen fluoride from admixture with light hydrocarbons including butane and lighter hydrocarbons. Another object is to remove and make available for subsequent utilization in the alkylation process the free hydrogen fluoride left in the hydrocarbon effluent product of a hydrogen fluoride alkylation process after treatment for recovery of hydrogen fluoride and also to remove and utilize the free hydrogen fluoride produced by the decomposition of organic fluorides during the course of separating the desired product from the hydrocarbon effluent by fractionation. Another object is to provide an improved method for removing free hydrogen fluoride from admixture with light paraffins including substantial amounts of each of isobutane, propane, ethane and methane. Another object is to provide such a process which recovers the free hydrogen fluoride simultaneously with the depropanizing operation. Another object is to recover the free hydrogen fluoride in the form of alkyl fluorides adapted to be recycled directly to the alkylation unit. Another object is to completely remove the corrosive hydrogen fluoride from the overhead product of the depropanizing operation conventionally applied to the overhead from the deisobutanizer in the conventional recovery system applied to the effluent from a hydrogen fluoride alkylation unit.

Figure 1:
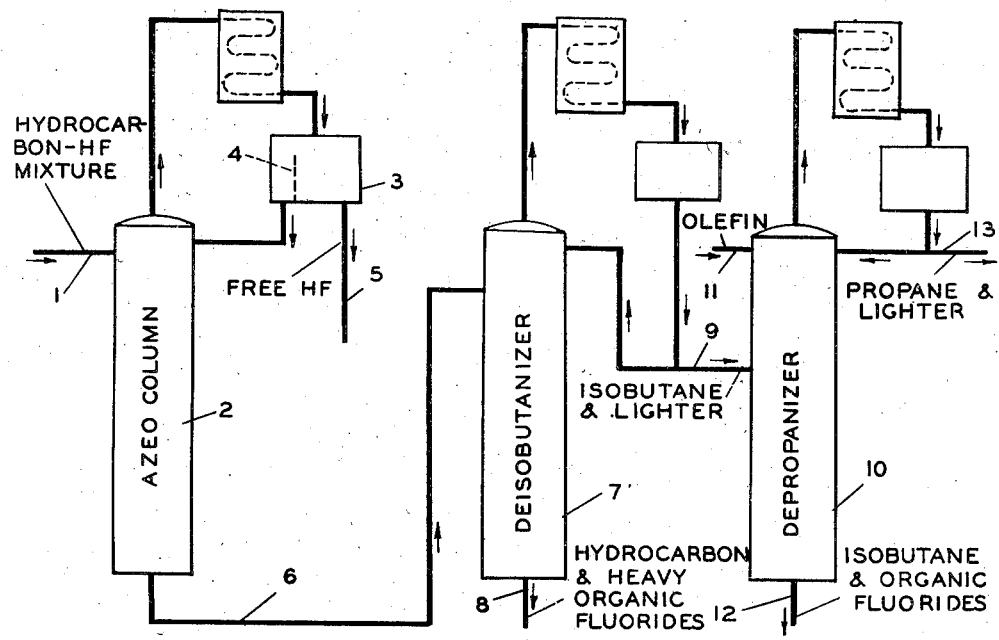
Figure 2:
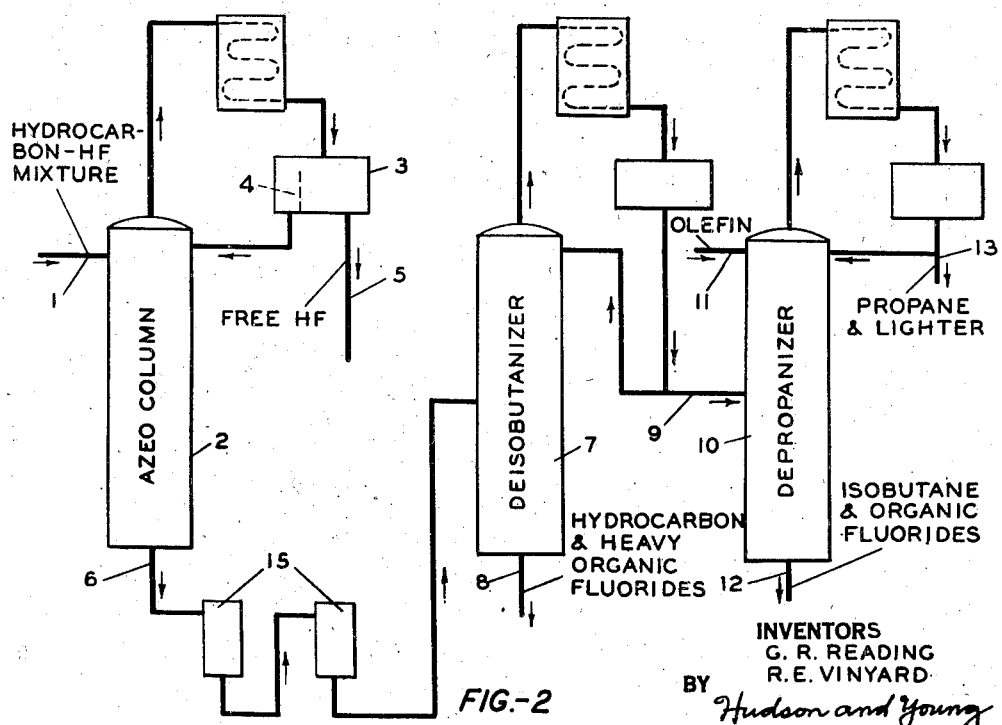

In the accompanying drawing, Figure 1 represents diagrammatically one arrangement of equipment by which the present invention may be practiced. Figure 2 shows an alternative arrangement of equipment in which the organic fluorides are removed before the deisobutanizing operation.

In hydrofluoric acid alkylation units a certain amount of hydrogen fluoride remains in the hydrocarbon effluent after the normal treating steps for the recovery and reuse of hydrogen fluoride. Also a certain amount of hydrogen fluoride is produced by the decomposition of organic fluorides during the course of separating the desired product from the hydrocarbon effluent by fractionation. The organic fluorides may be residual fluorides in the total hydrocarbon effluent from a hydrofluoric acid alkylation process after treatment for removal of the major portion of said organic fluorides or they may be the total organic fluoride effluent from the hydrogen fluoride alkylation process depending upon whether treatment of the hydrocarbon effluent from the alkylation process to decompose the organic fluorides is performed before or after removal of light hydrocarbons from the total hydrocarbon effluent by fractionation. The amount of hydrogen fluoride produced by decomposition of organic fluorides will be dependent primarily upon whether or not the hydrocarbon effluent stream from the hydrogen fluoride alkylation unit is treated for organic fluoride removal before or after fractionation to remove the light hydrocarbons such as isobutane and lighter. It will also be dependent upon the temperature in the fractionator and the residence time of the organic fluorides therein.

In any event whatever the source of free hydrogen fluoride it will tend to concentrate in the isobutane and lighter fraction above mentioned. In hydrogen fluoride alkylation, it is almost invariably desirable to recover the isobutane and recycle it to the alkylation zone. However, before the isobutane is so recycled it is necessary to remove the light gas diluents such as propane, ethane, methane, etc., by fractionation. In so doing the free hydrogen fluoride concentrates in the light gases which are normally discarded so far as the alkylation process is concerned. Thus over a period of time, an appreciable amount of hydrogen fluoride is lost from the alkylation process. Also, its presence involves a corrosion problem.

In order to eliminate the difficulties above mentioned, the present invention provides for the introduction of an unsaturated hydrocarbon into the fractionator used for separating the light hydrocarbon diluents from the isobutane and lighter stream. The quantity of unsaturated hydrocarbon so introduced should be in excess of that required to form the organic fluoride with the amount of free hydrogen fluoride present. Usually the unsaturated hydrocarbon will be the olefin which is used in the alkylation process. For example, if isobutane is being alkylated with butylenes, butylenes preferably constitute the olefin added to the fractionating column wherein the lighter hydrocarbon diluents are removed from the isobutane.

The olefin preferably should be added at a point near the top of the fractionating column where the concentration of the hydrogen fluoride in the liquid on the trays is relatively high. However, less desirably, it may be added with the feed or with the reflux to the column. The olefin reacts with the free hydrogen fluoride to form organic fluorides which are less volatile than the free hydrogen fluoride and light hydrocarbons being taken overhead. Consequently, the organic fluorides thus formed are retained in the kettle of the fractionator with the isobutane which is subsequently recycled to the alkylation unit. Usually the excess olefin is also less volatile than the light gases being taken overhead and consequently is retained in the isobutane bottoms fraction and recycled to the alkylation unit to contribute a part of the olefin feed. In the alkylation unit the organic fluorides and isobutane alkylate, releasing free hydrogen fluoride. Thus an amount of hydrogen fluoride that would otherwise be lost from the alkylation unit is returned thereto.

Referring to the drawings, that portion of the alkylation unit which lies between the settler and the depropanizer has been illustrated although it does not form per se any part of the present invention. In Figure 1 the hydrocarbon-hydrogen fluoride mixture from the alkylation unit settler wherein the alkylation effluent is settled into two phases, namely, an acid phase which is at least partially regenerated and a hydrocarbon phase which contains the alkylated product, is fed via line 1 to azeo column 2 wherein there are taken overhead azeotropes of light hydrocarbons including butanes and propane with hydrogen fluoride. This overhead is condensed and allowed to separate into two phases in accumulator 3, the hydrocarbon phase overflowing weir 4 being employed as reflux, and the free hydrogen fluoride layer being withdrawn via line 5 and recycled to the alkylation unit.

The bottoms from azeo column 2 passes via line 6 to deisobutanizer 7 where the isobutane and lighter is taken overhead while a kettle product containing hydrocarbon and organic fluorides heavier than isobutane is withdrawn via line 8 and passes to organic fluoride removal steps and further fractionation for recovery of alkylate and other components (not shown).

The overhead product from column 7 contains isobutane and lighter hydrocarbons together with free hydrogen fluoride and organic fluorides which are lighter than isobutane. This product passes via line 9 to depropanizing column 10 where it is subjected to treatment effecting removal of its free hydrogen fluoride content thereby preventing hydrogen fluoride from appearing in the depropanizer overhead. This is accomplished in accordance with the present invention by the introduction of a low-boiling aliphatic olefin, preferably a C₃ to C₅ olefin, via line 11 at the top of the column. This olefin combines with the free hydrogen fluoride in the column forming an alkyl fluoride which is of such volatility that it appears in the bottoms product leaving via line 12. The hydrogen fluoride-free overhead of propane and lighter hydrocarbons is condensed in the usual way and withdrawn via line 13.

It is preferred that the olefin added in depropanizer 10 be of such volatility that it will descend in the column and the excess thereof will appear in the bottoms product. Thus, it is preferred that the olefin be either butylenes or heavier since propylene would be taken overhead with the propane although propyl fluoride would go out the bottom.

Figure 2 is identical with Figure 1 except that treaters 15 for removal of organic fluorides are interposed in line 6. The effluent from these treaters has been substantially freed from light organic fluorides but contains some free hydrogen fluoride and residual heavy organic fluorides. These residual heavy organic fluorides are decomposed to some extent in deisobutanizer 7. The remaining heavy organic fluorides leave in the bottom via line 8. The isobutane and lighter stream flowing via line 9 to depropanizer 10 contains some free hydrogen fluoride which was not removed in treaters 15 and which was generated in deisobutanizer 7 by decomposition of organic fluorides therein.

In a modification of the present invention, the unsaturated hydrocarbon is added to the fractionator used in separating the isobutane and lighter from the total hydrocarbon effluent from the hydrogen fluoride alkylation unit. However, in order eventually to return the hydrogen fluoride to the alkylation zone, it is necessary to use a light olefin in order to produce an alkyl fluoride sufficiently volatile to be removed with the isobutane and lighter stream. Preferably the olefin is one which will result in an alkyl fluoride of about the same volatility as isobutane, for example, propylene. Use of an olefin which results in alkyl fluoride considerably more or less volatile than isobutane will result in the loss of the hydrogen fluoride so far as the alkylation unit is concerned. In the first instance the hydrogen fluoride will be lost as organic fluorides in the overhead product of the fractionator which separates the lighter hydrocarbons from the isobutane. In the second instance, it is retained as fluorides in the hydrocarbons heavier than isobutane. However, in either of these cases the advantage of removing the corrosive agent, hydrogen fluoride, is still obtained.

While the invention has been discussed primarily from the standpoint of alkylation of isobutane with a butylene, it should be understood that it is not limited thereto but can be applied to other types of alkylation processes. With proper modifications the use of olefins for neutralizing corrosive hydrogen fluoride may be applied in other hydrogen fluoride hydrocarbon conversion processes.

We claim:

1. A process of removing free hydrogen fluoride which is present as an impurity in admixture with a mixture of low-boiling paraffin hydrocarbons including hydrocarbons heavier than butane, butane and hydrocarbons lighter than butane, which comprises passing said mixture into a debutanizing zone and there fractionally distilling same in such manner as to separate same into an overhead fraction of butane and lower-boiling material and a bottoms fraction of components heavier than butane and introducing into said zone propylene in stoichiometric excess over the free hydrogen fluoride content of said mixture, causing said propylene to combine with said free hydrogen fluoride to form propyl fluoride, said propyl fluoride and the excess of said propylene appearing in said overhead fraction, and subjecting said overhead fraction to fractional distillation in a depropanizing zone in such manner as to separate same into a fraction of propane and lighter which is completely free from hydrogen fluoride and a bottoms fraction of isobutane and said propyl fluoride.

2. In the alkylation of low-boiling paraffins and olefins in the presence of hydrogen fluoride as the catalyst which comprises the steps of passing a mixture of low-boiling paraffins and olefins into a reaction zone under conditions of alkylation, introducing hydrogen fluoride into said reaction zone, passing a hydrocarbon conversion effluent containing butanes and heavier hydrocarbons and minor amounts of propane and lighter hydrocarbons from said reaction zone to a separator wherein a liquid hydrocarbon phase and a heavier liquid hydrogen fluoride phase are separated, passing said liquid hydrogen fluoride back to said reaction zone, passing said liquid hydrocarbon phase to a fractional distillation, removing an overhead product comprising low-boiling hydrocarbons and hydrogen fluoride, separating said overhead fraction into a liquid hydrocarbon phase and a liquid hydrogen fluoride phase, passing said liquid hydrogen fluoride phase back to said reaction zone, removing a bottom fraction containing a minor amount of hydrogen fluoride from said fractional distillation and passing same to another fractional distillation, removing an overhead fraction comprising butanes and lighter hydrocarbons with hydrogen fluoride as an impurity therein, removing an alkylate as a bottom fraction from said fractional distillation as a product of the process, passing said overhead fraction to a fractional distillation and removing therefrom a bottom fraction comprising butanes and recycling same to said reaction zone, the improvement which comprises carrying out said last fractional distillation in the presence of an olefin which is present in sufficient amount to react with said hydrogen fluoride contained in said overhead fraction, withdrawing propane and lighter hydrocarbons substantially free of hydrogen fluoride as an overhead product from said last fractional distillation and withdrawing a bottom fraction comprising butanes and hydrogen fluoride in combination with said olefin and recycling the same to said reaction zone.

3. In the alkylation of low-boiling paraffins and olefins in the presence of hydrogen fluoride as the catalyst which comprises the steps of passing a mixture of low-boiling paraffins and olefins into a reaction zone under conditions of alkylation, introducing hydrogen fluoride into said reaction zone, passing a hydrocarbon conversion effluent containing butanes and heavier hydrocarbons and minor amounts of propane and lighter hydrocarbons from said reaction zone to a separator wherein a liquid hydrocarbon phase and a heavier liquid hydrogen fluoride phase are separated, passing said liquid hydrogen fluoride back to said reaction zone, passing said liquid hydrocarbon phase to a fractional distillation, removing an overhead product comprising low-boiling hydrocarbons and hydrogen fluoride, separating said overhead fraction into a liquid hydrocarbon phase and a liquid hydrogen fluoride phase, passing said liquid hydrocarbon phase back to said fractional distillation as a reflux therefor, passing said liquid hydrogen fluoride phase back to said reaction zone, removing a bottom fraction containing a minor amount of hydrogen fluoride from said fractional distillation and passing same to another fractional distillation, removing an overhead fraction comprising butanes and lighter hydrocarbons with hydrogen fluoride as an impurity therein, removing an alkylate as a bottom fraction from said fractional distillation as a product of the process, passing said overhead fraction to a fractional distillation and removing therefrom a bottom fraction comprising butanes and recycling same to said reaction zone, the improvement which comprises introducing an olefin into said overhead fraction from said second fractional distillation to combine with all of said hydrogen fluoride contained therein, passing the resulting mixture to said last fractional distillation, removing an overhead fraction comprising propane and lighter hydrocarbons substantially free of hydrogen fluoride, and removing a bottom fraction comprising butane and hydrogen fluoride combined with said olefin and recycling same to said reaction zone.

4. The process of removing free hydrogen fluoride which is present as an impurity in admixture with a mixture of light paraffins including substantial amounts of isobutane, propane, ethane, and methane, which comprises passing said mixture into a depropanizing zone and there fractionally distilling same in such manner as to separate same into an overhead fraction comprising propane, ethane and methane, and a bottoms fraction comprising isobutane and any heavier component, preventing hydrogen fluoride from leaving with said overhead fraction by introducing propylene into said zone at a point adjacent the top thereof and in stoichiometric excess over the free hydrogen fluoride content of said mixture, causing said propylene to combine with said free hydrogen fluoride to form propyl fluoride, and removing said propyl fluoride with said bottoms fractions and excess propylene with said overhead fraction.

5. In a process for the conversion of hydrocarbons in the presence of hydrogen fluoride in which a substantial amount of isobutane is present in the effluent together with propane and higher-boiling hydrocarbons, the improvement comprising separating from conversion effluents a hydrocarbon-rich phase containing isobutane and higher-boiling hydrocarbons, propane and hydrogen fluoride, distilling said hydrocarbon phase to form a bottom product comprising hydrocarbons higher-boiling than isobutane and an overhead product comprising isobutane and propane and hydrogen fluoride, distilling said overhead product from said first distillation under conditions such that an overhead product comprising propane and a bottom product comprising isobutane are formed, adding to the material undergoing distillation in said first distillation propylene in stoichiometric excess over the free hydrogen fluoride content of the material undergoing distillation in said second distillation under conditions such that propylene combines with hydrogen fluoride to form propyl fluoride, passing said propyl fluoride and any excess propylene overhead with said overhead product from said first distillation, and removing said propyl fluoride with said bottom product from said second distillation.

6. In a process for the alkylation of isobutane with a butylene in the presence of hydrogen fluoride as alkylation catalyst, the improvement comprising separating from alkylation effluents a hydrocarbon-rich phase containing isobutane, propane and hydrogen fluoride, distilling said hydrocarbon phase to form a bottom product comprising isobutane and an overhead product comprising propane, effecting said distillation in the presence of added propylene under conditions such that said propylene combines with said hydrogen fluoride, said propylene being present in stoichiometric excess over the free hydrogen fluoride content of the material undergoing said dis- 'tillation, and removing said combined hydrogen fluoride with said bottom product and excess propylene with said overhead product.

7. In the conversion of a paraffin hydrocarbon in the presence of hydrogen fluoride as a catalyst in which a substantial amount of isobutane is present in the effluent together with propane and higher-boiling hydrocarbons, the improvement which comprises passing a conversion effluent, containing hydrogen fluoride, isobutane and higher boiling hydrocarbons and a minor amount of propane from said reaction zone to a separating means wherein a liquid hydrocarbon phase containing hydrogen fluoride and a heavier liquid hydrogen fluoride phase are separated, passing said liquid hydrocarbon phase to a first distillation, removing an overhead product comprising low-boiling hydrocarbons and hydrogen fluoride and a bottom product containing higher-boiling hydrocarbons including isobutane and propane and a minor amount of hydrogen fluoride from said first distillation, passing said bottom product from said first distillation to a second distillation, removing an overhead product comprising isobutane and propane together with hydrogen fluoride and a bottom product comprising hydrocarbons higher boiling than isobutane from said second distillation, passing said overhead product from said second distillation to a third distillation and removing therefrom a bottom product comprising isobutane and an overhead product comprising propane, effecting said third distillation in the presence of an added olefin which is present in sufficient amount to react with substantially all of said hydrogen fluoride contained in said overhead product from said second distillation, and withdrawing an overhead product comprising propane substantially free from hydrogen fluoride and a bottom product comprising isobutane and hydrogen fluoride in combination with said olefin from said third distillation.

8. In a process for the conversion of a paraffin hydrocarbon in the presence of hydrogen fluoride in which a substantial amount of a butane is present in the effluent together with propane, the improvement comprising separating from conversion effluents a hydrocarbon-rich phase containing a butane and lower boiling material including propane and hydrogen fluoride, distilling the hydrocarbon phase to form a bottom product comprising a butane and an overhead product comprising propane, and preventing hydrogen fluoride from leaving said distillation in said overhead product which comprises effecting said distillation in the presence of a low-boiling aliphatic olefin to form an aliphatic fluoride corresponding to said olefin having such volatility that it is prevented from appearing in said overhead, said aliphatic olefin being present in said distillation in stoichiometric excess over the free hydrogen fluoride content therein, and removing the thus formed aliphatic fluoride from said distillation with the bottom product.

9. The process of claim 8 in which said olefin has three to five, inclusive, carbon atoms per molecule.

10. The process of claim 8 in which said olefin comprises a butylene.

11. The process of claim 8 in which said olefin comprises a propylene.

12. The process of claim 7 in which said conversion is the alkylation of an excess of isobutane with an olefin and in which the bottom product of said third distillation is returned to said conversion.

13. In a process for reacting isobutane with a low-boiling olefin in the presence of a hydrofluoric acid catalyst to produce higher-boiling paraffin hydrocarbons, the improvement which comprises passing liquid hydrocarbon effluents of such a reaction containing dissolved hydrogen fluoride to a first fractional distillation means, removing from said means as a low-boiling fraction substantially all of the isobutane and lighter hydrocarbons contained in said effluents together with said dissolved hydrogen fluoride, passing said lighter fraction to a second fractional distillation means, introducing also into said second distillation means an olefin-containing hydrocarbon material, the olefin constituents of which are such that they will react with isobutane to produce paraffin hydrocarbons boiling in the motor fuel range, in an amount sufficient to react with said hydrogen fluoride and form an alkyl fluoride, removing from said second means a low-boiling fraction which is substantially free from hydrogen fluoride and isobutane, removing also from said second means a high-boiling fraction comprising isobutane and alkyl fluoride, and passing said high-boiling fraction to an alkylation zone.

GEORGE R. READING.
ROY E. VINYARD.

REFERENCES CITED

The following references are of record in the file of this patent:

UNITED STATES PATENTS

| Number | Name | Date |
|---|---|---|
| 2,307,799 | Linn | Jan. 12, 1943 |
| 2,317,901 | Frey | Apr. 27, 1943 |
| 2,322,800 | Frey | June 29, 1943 |
| 2,342,677 | Linn | Feb. 29, 1944 |